(12) United States Patent
Davey et al.

(10) Patent No.: US 9,577,503 B2
(45) Date of Patent: Feb. 21, 2017

(54) ROTATING MACHINES USING TRAPPED FIELD MAGNETS AND RELATED METHODS

(75) Inventors: Kent Davey, Edgewater, FL (US); Xueqing Feng, Austin, TX (US); Jim Weldon, Liberty Hill, TX (US); Michael D. Werst, Manor, TX (US); Robert Hebner, Austin, TX (US)

(73) Assignees: The Board of Regents of the University of Texas System, Austin, TX (US); TECO-Westinghouse Motor Company, Round Rock, TX (US)

( * ) Notice: Subject to any disclaimer, the term of this patent is extended or adjusted under 35 U.S.C. 154(b) by 509 days.

(21) Appl. No.: 13/068,118

(22) Filed: May 3, 2011

(65) Prior Publication Data

US 2011/0285236 A1 Nov. 24, 2011

Related U.S. Application Data

(60) Provisional application No. 61/343,718, filed on May 3, 2010.

(51) Int. Cl.
*H02K 1/27* (2006.01)
*H02K 55/02* (2006.01)
*H01F 6/00* (2006.01)

(52) U.S. Cl.
CPC ............... *H02K 55/02* (2013.01); *H01F 6/00* (2013.01); *H02K 1/276* (2013.01); *H02K 1/278* (2013.01); *Y02E 40/622* (2013.01)

(58) Field of Classification Search
None
See application file for complete search history.

(56) References Cited

U.S. PATENT DOCUMENTS

| 4,697,114 | A  | * | 9/1987  | Amemiya et al. ....... 310/156.61 |
| 4,987,674 | A  |   | 1/1991  | Denk |
| 5,066,638 | A  |   | 11/1991 | Lloyd et al. |
| 5,138,207 | A  |   | 8/1992  | Hilal et al. |
| 5,177,054 | A  |   | 1/1993  | Lloyd et al. |
| 5,325,002 | A  | * | 6/1994  | Rabinowitz et al. .. H02K 55/04 310/10 |
| 5,563,564 | A  | * | 10/1996 | Chu et al. ..................... 335/216 |
| 6,025,769 | A  |   | 2/2000  | Chu et al. |
| 6,169,352 | B1 | * | 1/2001  | Hull ....................... H02K 7/025 310/156.43 |
| 6,703,743 | B2 | * | 3/2004  | Kaneko et al. .......... 310/156.38 |
| 6,853,106 | B2 | * | 2/2005  | Fujiwara et al. ............. 310/184 |
| 6,987,342 | B2 | * | 1/2006  | Hans ....................... 310/156.56 |

(Continued)

FOREIGN PATENT DOCUMENTS

| EP | 0475881 | 3/1992 |
| EP | 0508936 | 10/1992 |

(Continued)

OTHER PUBLICATIONS

"TECO demonstrates bulk HTS motor," Superconductor Week, 21(2): 2, 2007.

(Continued)

*Primary Examiner* — Tran Nguyen
(74) *Attorney, Agent, or Firm* — Norton Rose Fulbright US LLP

(57) ABSTRACT

Rotors with trapped-field magnet (TFM) bulks, machines with TFM rotors, and methods of activating and/or using machines with TFM rotors.

23 Claims, 15 Drawing Sheets

(56) References Cited

U.S. PATENT DOCUMENTS

| | | | |
|---|---|---|---|
| 7,148,598 B2* | 12/2006 | Ionel et al. | 310/156.55 |
| 7,388,310 B2* | 6/2008 | Abou-Akar et al. | 310/156.48 |
| 7,405,503 B2* | 7/2008 | Aoyama | 310/156.53 |
| 7,598,645 B2* | 10/2009 | Ley et al. | 310/156.38 |
| 2004/0098443 A1 | 5/2004 | Omelyanchouk et al. | |
| 2007/0052304 A1* | 3/2007 | Masson et al. | 310/52 |
| 2007/0252469 A1* | 11/2007 | Nishiura et al. | 310/156.56 |
| 2009/0302982 A1* | 12/2009 | Putman et al. | 335/216 |

FOREIGN PATENT DOCUMENTS

| | | |
|---|---|---|
| EP | 1583209 | 10/2005 |
| WO | WO 93/16519 | 8/1993 |
| WO | WO 99/04477 | 1/1999 |

OTHER PUBLICATIONS

Stumberger et al.: "Design of a linear bulk superconductor magnet synchronous motor for electromagnetic aircraft launch systems," IEEE Transactions on Applied Superconductivity, 14(1): 54-62, 2004.

Bean, C.P.: "Magnetization of High-Field Superconductors", Reviews of Modern Physics, (Jan. 1964), pp. 31-39.

Davey, K. et al.: "Development and analysis of YBCO tapped field magnets in electromechanical devices," IEEE Transactions on Magnetics, 44(6), (2006), pp. 930-933.

Davey, K. et al.: "HTS Trapped Field Magnet-Based Motors for Naval Applications," American Society of Naval Engineers: Electric Machine Technology Symposium, (2006), pp. 308-313.

Feng, X. et al.: "Radial flux high temperature superconductor motor using bulk trapped field magnets," IEEE International Electric Machines and Drives Conference, (2009), pp. 458-464.

Fuchs, G. et al.: "Strongly enhanced irreversibility fields and Bose-glass behaviour in bulk YBCO with discontinuous columnar irradiation defects," Superconductor Science and Technology, 20, (2007) pp. S197-S204.

Qiu, M. et a.: "Studies on high temperature superconducting permanent magnet," IEEE Transactions on Applied Superconductivity, 12(1), (Mar. 2002), pp. 1159-1162.

Qiu, M. et al.: "Technical analysis on the application of HST bulk in 'permanent magnet' motor," IEEE Transactions on Applied Superconductivity, 15(2), (Jun. 2005), pp. 3172-3175.

Rupich, M.W. et al.: "Metalorganic Deposition of YBCO Films for Second-Generator High-Temperature Superconductor Wires," MRS Bulletin, (Aug. 2004), pp. 572-578.

Salama, K. et al.: "High current density in bulk $YBa_2Cu_3O_x$ superconductor," Appl. Phys. Lett., 54(23), (Jun. 1989), pp. 2352-2354.

Tomita, M. et al.: "High-Temperature Superconductor Bulk Magnets That Can Trap Magnetic Fields of Over 17 Tesla at 29K", Nature, 421, (Jan. 2003), pp. 517-520.

Weinstein, R. et al.: "An experimental Generator Using High Temperature Superconducting Quasi-Permanent Magnets," IEEE Transactions on Applied Superconductivity, 5(2), (Jun. 1995), pp. 441-444.

Weinstein, R. et al.: "The role of uranium chemistry and uranium fission in obtaining ultra-high Jc in textured Y123", Superconductor Science and Technology, 11, (1998), pp. 959-962.

Weinstein, R. et al.: "Very High Trapped Fields: Cracking, Creep, and Pinning Centers", Proceedings of 10th Anniversary HTS Workshop on Physics, Materials and Applications, Houston, World Scientific Press, (Mar. 1996), pp. 625-628.

Declaration of Inventor Robert Hebner, Ph. D., dated Apr. 25, 2016.

* cited by examiner

ROTATING MACHINES USING TRAPPED FIELD MAGNETS AND RELATED METHODS

CROSS-REFERENCE TO RELATED APPLICATION

The present application claims priority to U.S. Provisional Patent Application Ser. No. 61/343,718, filed May 3, 2010, the contents of which are incorporated by reference.

BACKGROUND

1. Field of the Invention

The present invention relates generally to rotors and electrical machines using rotors, and, more particularly, but not by way of limitation, to rotors and electrical machines using rotors that include trapped-field magnet (TFM) bulks.

2. Description of Related Art

Rotors and machines using rotors have been known in the art for some time. Electrical machines such as motors traditionally include brushes and a rotor with wire windings. Such traditional winding-based rotors may be relatively inefficient compared with PM rotors, and PM rotors may be made smaller than traditional winding-based rotors for a given capacity or output. Rotors with superconductor wires instead of permanent magnets have been attempted.

Current high-temperature superconductor (HTS or HTSC) rotors and machines generally address niche markets, and may provide a modest improvement in size, weight, and efficiency over PM rotors and machines. However, this modest improvement typically comes with a high premium cost. The majority of current HTS machines use superconductor wires.

SUMMARY OF THE INVENTION

The present disclosure includes various embodiments of trapped-field magnet (TFM) rotors, TFM synchronous machines, and methods of activating TFM bulks in a synchronous machine.

Some embodiments of the present TFM rotors comprise: a rotor core having an axis of rotation and an outer perimeter, the rotor core defining a plurality of TFM-bulk openings around the axis of rotation and within the outer perimeter; and a plurality of TFM bulks disposed in the TFM-bulk openings of the rotor core; where the plurality of TFM-bulk openings comprises three or more TFM bulk openings disposed at equiangular intervals around the axis of rotation.

In some embodiments, the plurality of TFM bulks comprises a plurality of TFM pucks. In some embodiments, at least a portion of (at least one of) the plurality of TFM bulks comprises a single grain. In some embodiments, at least a portion of (at least some of) the plurality of TFM pucks are adjacent one another in one of the plurality of TFM-bulk openings. In some embodiments, at least one of the plurality of TFM pucks has a substantially constant cross-section along its length. In some embodiments, each of the plurality of TFM pucks has a transverse dimension that is greater than its length along a central longitudinal axis. In some embodiments, each of the plurality of TFM pucks is configured such that its central longitudinal axis is substantially perpendicular to the axis of rotation of the rotor. In some embodiments, at least one of the plurality of TFM pucks has a hexagonal cross-sectional shape.

Some embodiments, further comprising a plurality of retaining pins in contact with the plurality of TFM pucks such that the retaining pins maintain the plurality of TFM pucks in substantially constant position relative to the rotor. In some embodiments, at least a portion of the plurality of TFM bulks comprises YBCO. In some embodiments, each of the plurality of TFM bulks comprises YBCO. In some embodiments, each of the plurality of TFM bulks comprises a puck comprising YBCO. In some embodiments, the plurality of TFM-bulk openings comprises four TFM-bulk openings. In some embodiments, the plurality of TFM-bulk openings comprises five TFM-bulk openings. In some embodiments, the plurality of TFM-bulk openings comprises six TFM-bulk openings. In some embodiments, the rotor core includes an end plate and one or more of the TFM-bulk openings is defined in part by the end plate.

In some embodiments, the TFM-bulk openings have a length that is substantially parallel to the axis of rotation. In some embodiments, a single row of TFM pucks is disposed in each TFM-bulk opening. In some embodiments, two rows of TFM pucks are disposed in each TFM-bulk opening. In some embodiments, each of the plurality of TFM-bulk openings has a height measured perpendicularly to the axis of rotation of the rotor, where the rotor is configured to be coupled to a shaft having a diameter, and where the height of each TFM-bulk opening is smaller than the radius of the shaft. In some embodiments, each of the plurality of TFM-bulk openings has a height measured perpendicularly to the axis of rotation of the rotor, where the rotor is configured to be coupled to a shaft having a diameter, and where the height of each TFM-bulk opening is larger than the radius of the shaft. In some embodiments, the rotor is unitary with the shaft.

In some embodiments, the rotor core comprises a first material, and defines a plurality of conductor opening around the axis of rotation and within the outer perimeter, and the rotor further comprises: a plurality of conductors disposed in the conductor openings; and one or more slip-ring couplings configured to permit a current to be applied to the plurality of conductors if the rotor is rotating relative to the stator. In some embodiments, the plurality of conductors comprises copper. In some embodiments, the plurality of conductors each comprises a tape-wound steel core. In some embodiments, the rotor core comprises steel.

In some embodiments, the rotor core comprises a first material, and defines a plurality of conductor opening around the axis of rotation and within the outer perimeter, and the rotor further comprises: a plurality of conductors disposed in the conductor openings; and one or more slip-ring couplings configured to permit a current to be applied to the plurality of conductors if the rotor is rotating relative to the stator.

Some embodiments of the present trapped-field magnet (TFM) synchronous machines comprise: a stator comprising slots and windings, the stator defining a rotor opening; and an embodiment of the present rotors disposed in the rotor opening of the stator such that the rotor can rotate relative to the stator. In some embodiments, the windings of the stator comprise: A-phase windings; B-phase windings; and C-phase windings; where the B-phase windings are connected in parallel with the C-phase windings, and the A-phase windings are connected in series with the B-phase and C-phase windings. In some embodiments, the stator comprises field coils, and where the machine is configured as a self-excited generator.

Some embodiments of the present methods of activating a trapped-field magnet (TFM) synchronous machine comprise: providing an embodiment of the present TFM synchronous machines; and applying a current to the windings of the stator to generate a magnetic field sufficient to magnetize the TFM bulks.

Some embodiments of the present methods of activating trapped-field magnet (TFM) bulks in a TFM-synchronous machine comprise applying a current to the windings of a stator comprising: slots and windings, the stator defining a rotor opening, and a rotor having a plurality of TFM bulks, the rotor disposed in the rotor opening of the stator such that the rotor can rotate relative to the stator, to generate a magnetic field sufficient to magnetize the TFM bulks.

In some embodiments of the present methods, the current applied to the windings is configured to generate a magnetic field at least as large as a desired initial magnetic field of the TFM bulks. In some embodiments, the current applied to the windings is configured to generate a magnetic field equal to a desired initial magnetic field of the TFM bulks. In some embodiments, the current is applied while the temperature of the TFM bulks is above 77K, and the method further comprises: cooling the TFM bulks to a temperature below 77K. In some embodiments, cooling the TFM bulks comprises permitting thermal communication between the TFM bulks and a fluid, such as a cryogenic fluid. In some embodiments, the cryogenic fluid comprises liquid nitrogen. In some embodiments, cooling is performed while the current is applied substantially continuously to the windings. In some embodiments, cooling is performed while the current is applied intermittently to the windings.

In some embodiments, cooling is performed while the current is applied periodically to the windings. In some embodiments, the current applied to the windings is configured to generate a magnetic field at least as twice as large as a desired initial magnetic field of the TFM bulks. In some embodiments, the current is applied while the temperature of the TFM bulks is below 77K.

Some embodiments of the present methods further comprise: cooling the stator to a temperature below 160K prior to applying a current to the windings. Some embodiments comprise: cooling the stator to a temperature at or below 153K prior to applying a current to the windings. In some embodiments, the windings of the stator comprise: A-phase windings; B-phase windings; and C-phase windings; the B-phase windings are connected in parallel with the C-phase windings, and the A-phase windings are connected in series with the B-phase and C-phase windings; the rotor has one or more d-axes; and the method further comprises substantially aligning the A-phase windings of the stator with one of the d-axes of the rotor.

Some embodiments of the present trapped-field magnet (TFM) synchronous machines comprise: a stator comprising slots and windings, the stator defining a rotor opening; and an embodiment of the present rotors (either (1) where the rotor core comprises a first material, and defines a plurality of conductor opening around the axis of rotation and within the outer perimeter, and the rotor further comprises: a plurality of conductors disposed in the conductor openings; and one or more slip-ring couplings configured to permit a current to be applied to the plurality of conductors if the rotor is rotating relative to the stator; or (2) where the rotor core comprises a first material, and defines a plurality of conductor opening around the axis of rotation and within the outer perimeter, and the rotor further comprises: a plurality of conductors disposed in the conductor openings; and one or more slip-ring couplings configured to permit a current to be applied to the plurality of conductors if the rotor is rotating relative to the stator) disposed in the rotor opening of the stator such that the rotor can rotate relative to the stator.

Some embodiments of the present methods of activating a trapped-field magnet (TFM) synchronous machine comprise: providing the TFM synchronous machine with a rotor ((either (1) where the rotor core comprises a first material, and defines a plurality of conductor opening around the axis of rotation and within the outer perimeter, and the rotor further comprises: a plurality of conductors disposed in the conductor openings; and one or more slip-ring couplings configured to permit a current to be applied to the plurality of conductors if the rotor is rotating relative to the stator; or (2) where the rotor core comprises a first material, and defines a plurality of conductor opening around the axis of rotation and within the outer perimeter, and the rotor further comprises: a plurality of conductors disposed in the conductor openings; and one or more slip-ring couplings configured to permit a current to be applied to the plurality of conductors if the rotor is rotating relative to the stator); and applying a current to the conductors of the rotor to generate a magnetic field sufficient to magnetize the TFM bulks.

In some embodiments of the present methods of activating trapped-field magnet (TFM) bulks in a TFM-synchronous machine, comprising applying a current to the conductors of a rotor of a TRM-synchronous machine comprising: a stator, defining a rotor opening, and a rotor having a plurality of TFM bulks and conductors, the rotor disposed in the rotor opening of the stator such that the rotor can rotate relative to the stator, to generate a magnetic field sufficient to magnetize the TFM bulks. In some embodiments, the current applied to the conductors is configured to generate a magnetic field at least as large as a desired initial magnetic field of the TFM bulks. In some embodiments, the current applied to the windings is configured to generate a magnetic field equal to the desired initial magnetic field of the TFM bulks. In some embodiments, the current is applied while the temperature of the TFM bulks is above 77K, and the method further comprises: cooling the TFM bulks to a temperature below 77K. In some embodiments, cooling the TFM bulks comprises permitting thermal communication between the TFM bulks and fluid, such as a cryogenic fluid. In some embodiments, the cryogenic fluid comprises liquid nitrogen. In some embodiments, cooling is performed while the current is applied substantially continuously to the conductors. In some embodiments, cooling is performed while the current is applied intermittently to the conductors. In some embodiments, cooling is performed while the current is applied periodically to the conductors. In some embodiments, the current applied to the conductors is configured to generate a magnetic field at least as twice as large as a desired initial magnetic field of the TFM bulks. In some embodiments, the current is applied while the temperature of the TFM bulks is below 77K.

Any embodiment of any of the present rotors, rotor components, and machines can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

The patent or application file contains at least one drawing executed in color. Copies of this patent or patent application publication with color drawings will be provided by the Office upon request and payment of the necessary fee. Specifically, the predicted field plots in FIGS. 4, 6 and 8 are in color.

DESCRIPTION OF ILLUSTRATIVE EMBODIMENTS

Figure 1:
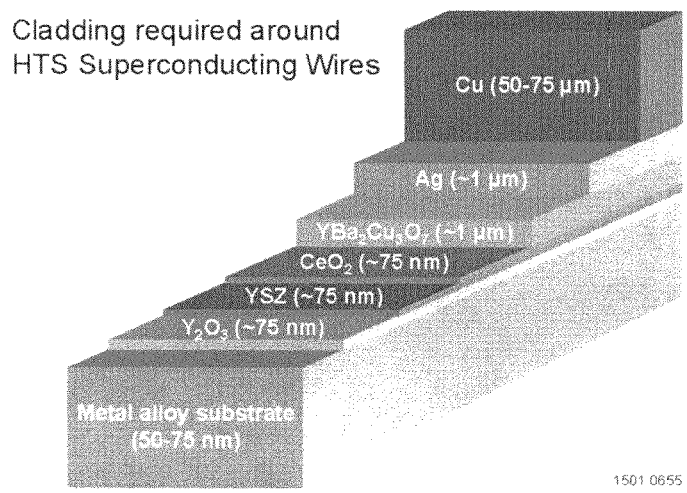
FIG. 1 depicts prior art in the form of cladding for a thin film HTS tape.

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art. In any embodiment of the present devices, systems, and methods, the terms "substantially," "approximately," and "about" may be substituted with "within [a percentage] of" what is specified, where the percentage includes 0.1, 1, 5, 10, and/or 15 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a device or system that that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. For example, in a rotor that comprises a rotor core having an axis of rotation; and a plurality of TFM bulks, the rotor includes the specified elements but is not limited to having only those elements. For example, such a rotor could also include retaining pins (e.g., coupled to and/or configured to retain the TFM bulks).

Further, a device or structure that is configured in a certain way is configured in at least that way, but it can also be configured in other ways than those specifically described.

The present inventors have designed, built, and successfully run a radial flux high temperature superconductor (HTS) trapped field magnet (TFM) motor. The motor was run in a zero field cooled mode. Field cooling, a preferred type of cooling, is cooling after exposure to the desired field level. This disclosure presents the configuration of the motor, alternative configurations, and methods of activating and/or using TFMs in motors and/or generators, including, for example, methods of activating TFMs in such a motor. Factors considered and discussed in this disclosure include, for example, (i) cooling time to field-cool TFMs in TFM rotor (e.g., in a machine such as a motor or generator comprising a TFM rotor); (ii) maximum field that can be produced at the rotor using only magnetomotive force (MMF) on the stator; and (iii) maximum time for which the stator current can be high without sustaining damage to insulation in the stator.

I. Introduction and Overview of General Embodiments

Some embodiments of the present TFM rotors comprise $YBa_2Cu_3O_y$ (YBCO), which has a critical current of up to 325 kA/cm$^2$, at 77° K and fields of 1 Tesla [1]. A practical TFM that can be mass-produced may achieve a current density of 300 kA/cm$^2$ [2], which can result in a trapped field of 2.3 Tesla in air using a TFM puck with a diameter of 2 centimeters (cm), and does not require cladding.

In contrast, prior art thin film HTS tapes typically require considerable cladding, such as, for example, illustrated in FIG. 1, which shows a typical thin film coated conductor assembly [3]. In the embodiment shown, the support layers are 129 μm thick. Currents in thin film YBCO may be $J_c$~1.2 MA/cm$^2$ at 77 K and zero applied field, but this decreases to $J_c$~200 kA/cm$^2$ at 1 Tesla. In the HTS tape of FIG. 1, the 129 μm thickness of the support reduces the effective $J_c$ to only ~3.1 kA/cm$^2$. Thus at the field of interest, ~1 Tesla, the effective (engineering) value of $J_c$ in a TFM can be about 100 times that of the coated conductors such as that of FIG. 1.

In the YBCO TFM pucks in certain embodiments of the present TFM rotors, critical current density generally increases by a factor of about two for every 12K dropped below 77K. One way of quantifying this is to measure the maximum achievable field at the surface of a 2 cm diameter TFM puck, 0.8 cm thick, in air, as listed in Table 1.

TABLE 1

| Field Increase with Temperature | |
|---|---|
| Temperature (° K) | Field in air (T) |
| 77 | 2.3 |
| 65 | 5.1 |
| 50 | 10.4 |

The bulk YBCO of certain embodiments of the present TFM rotors has certain advantage over HTS wires. However, three things should be considered when varying the present embodiments. First, YBCO material generally must be grown as a quasi-crystal, called a "grain." The method of melt-texturing [4] can be used to produce high-quality single grains with a diameter of about 2 at values of $J_c$ quoted above, and the method is approaching the ability to produce grains with a diameter of 3 cm. Because the maximum TFM field is $B_{max} \propto J_c \times$ diameter, and 2 cm grain diameter can provide $B_{max}$ of ~2.3 Tesla in air, 3 cm diameter grains are expected to provide $B_{max}$~2.7 Tesla. YBCO TFM bulks or grains can be cast or cut to desired shapes, and can be machined to 0.005-inch tolerances. Hexagons may be particularly suitable for the present TFM rotors because they are conveniently configured for tiled arrangements. Because YBCO is not superconducting, the current within the TFM puck lies at the perimeter of the puck. Some attention has been given to joining layers between TFMs, but current flow across the interface remains limited. This makes a bulk YBCO array similar to a number of strong, but small magnetic dipoles, and may limit arrays in practical applications.

Second, YBCO material must be activated or magnetized. Bulk TFMs (e.g. pucks) are capable of trapping fields in excess of 17 T [5], but this may not be easy to achieve. For example, to maximize the field, a YBCO puck must be exposed to a magnetic field (applied parallel to the c-axis) equal to or greater than the largest B field that can be supported by a current density of $J_c$ throughout the puck. For a 2 cm YBCO TFM puck prepared with U/n irradiation, this value is 2.3 T. If the puck is exposed to this field, cooled, and then the source field removed, a current density of $J_c$ will reside throughout the puck, with a peak field of 2.3 T (full activation). A current density of the same value resides in the puck when it is exposed to a 1 T field during activation, but only a portion of the puck will have current, and the remainder will have none. If the puck is cooled before the field is applied, the TFM puck can only be fully activated by exposing it to a field of twice the desired final value. If the material can be cooled after exposure to the desired magnetic field density, the full value of the activating field can be used to generate torque (e.g., the applied field need only be as great as the desired field).

Third, once a YBCO TFM puck is activated, the magnetic field typically decreases over time. For example, the trapped field typically decreases with time at a rate of 4% per decade of time. For example, a field that is 3 T 10 minutes after activation will be ~2.88 T 100 minutes after activation. This means that the field does not drop below ~80% of its initial value in practical equipment life-times. However, if such a field decrease is not palatable, a method of essentially stopping the decrease of trapped field has been developed [6], and can be accomplished by decreasing the temperature of the TFM by ~4 K, after activation.

In the present embodiments of TFM rotors and motors, the present motors may be similar in some respects to permanent magnet (PM) motors (e.g., have a conventional three phase winding on the stator), but have TFM bulks (e.g., TFM pucks) instead of PMs.

II. Activation from the Stator

Figure 2:
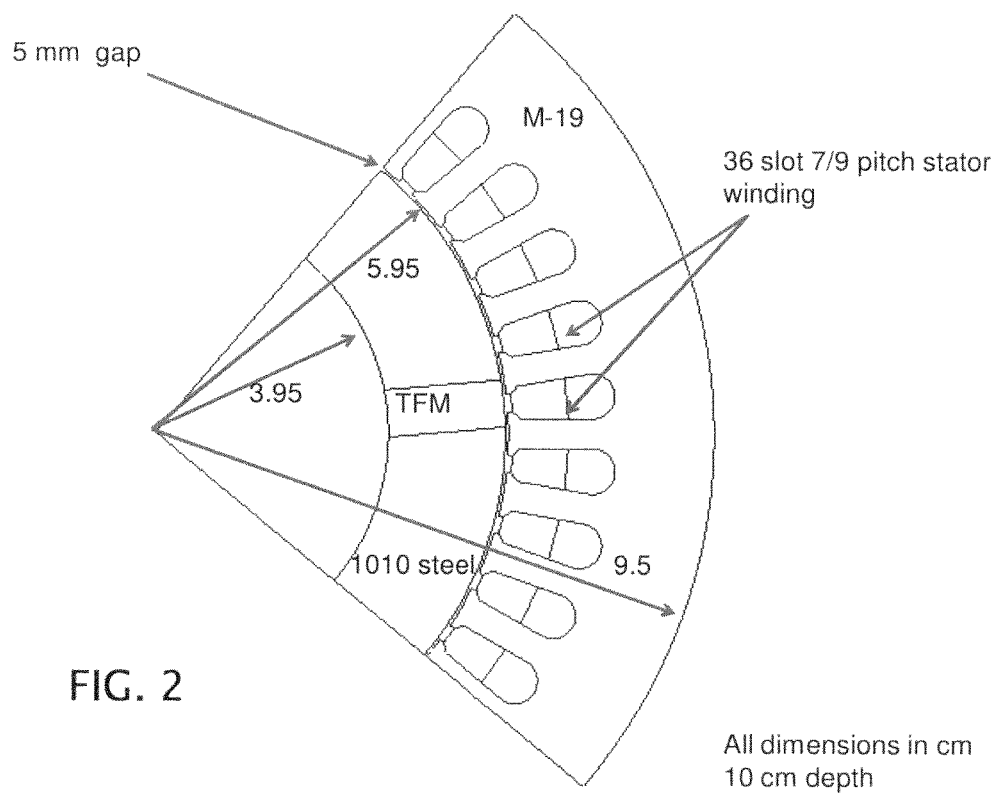
FIG. 2 depicts a cross-sectional view of one of the present four-pole radial flux TFM rotors.
Figure 3:
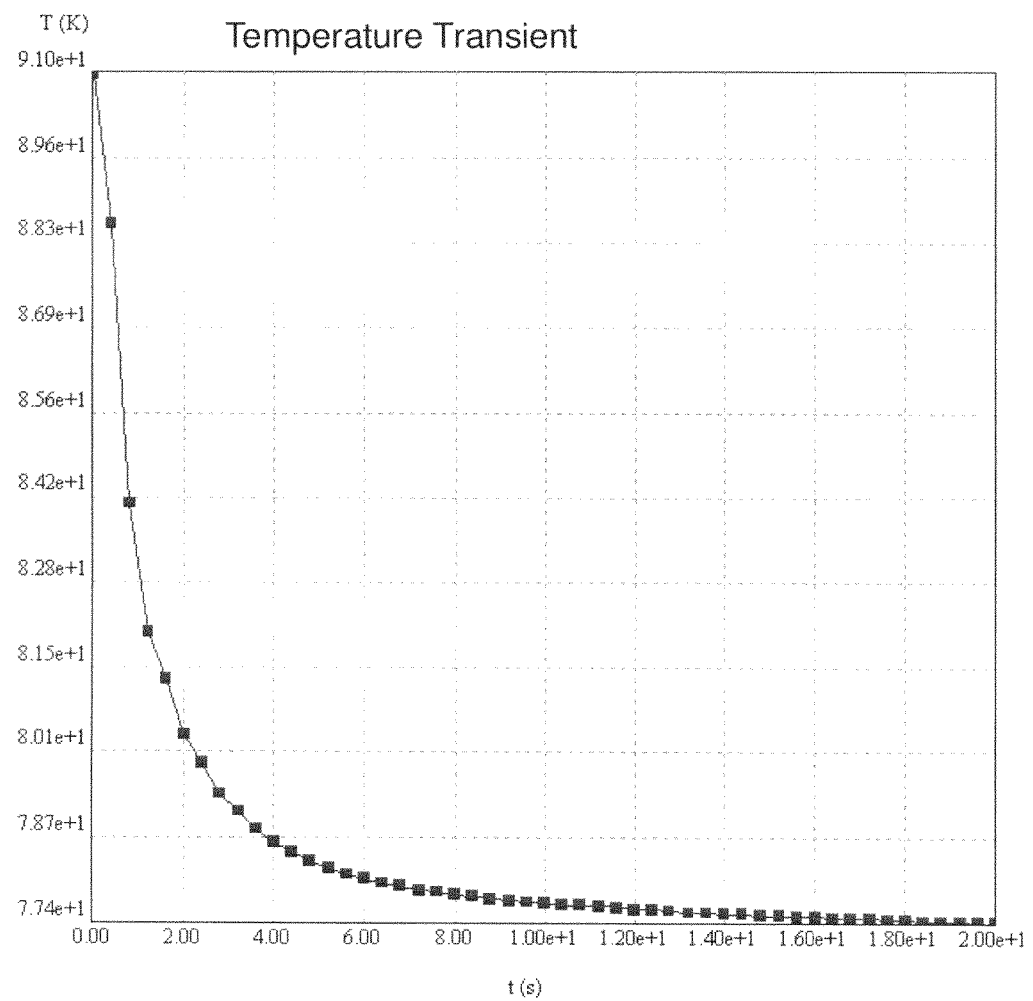
FIG. 3 depicts a predictive transient temperature profile over time for one of the present TFM pucks when cooled with liquid $N_2$.
Figure 4:
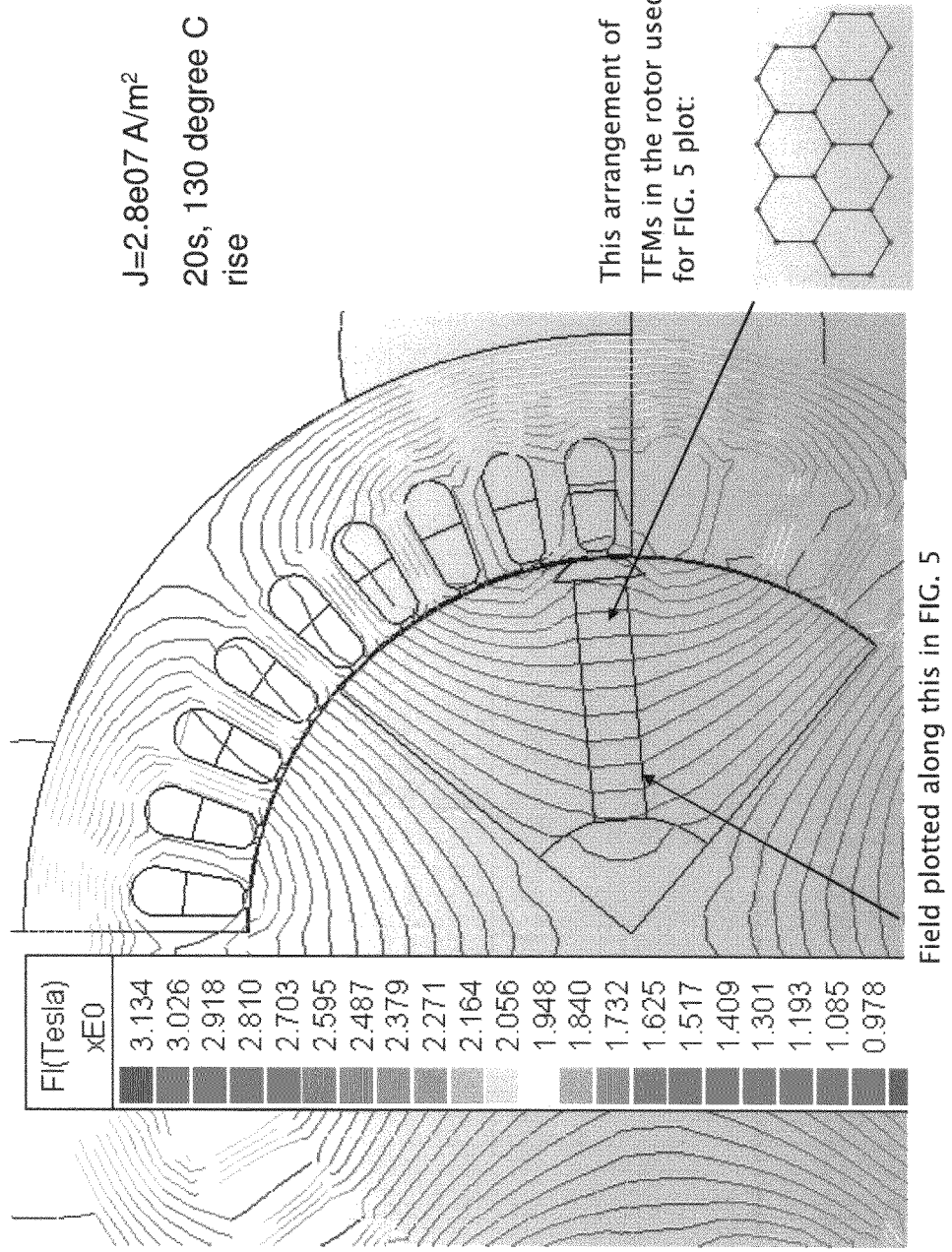
FIG. 4 depicts a partial cross-sectional view of one of the present TFM rotors, showing the magnetic field expected in the rotor assuming a 130° C. temperature rise in the stator.
Figure 6:
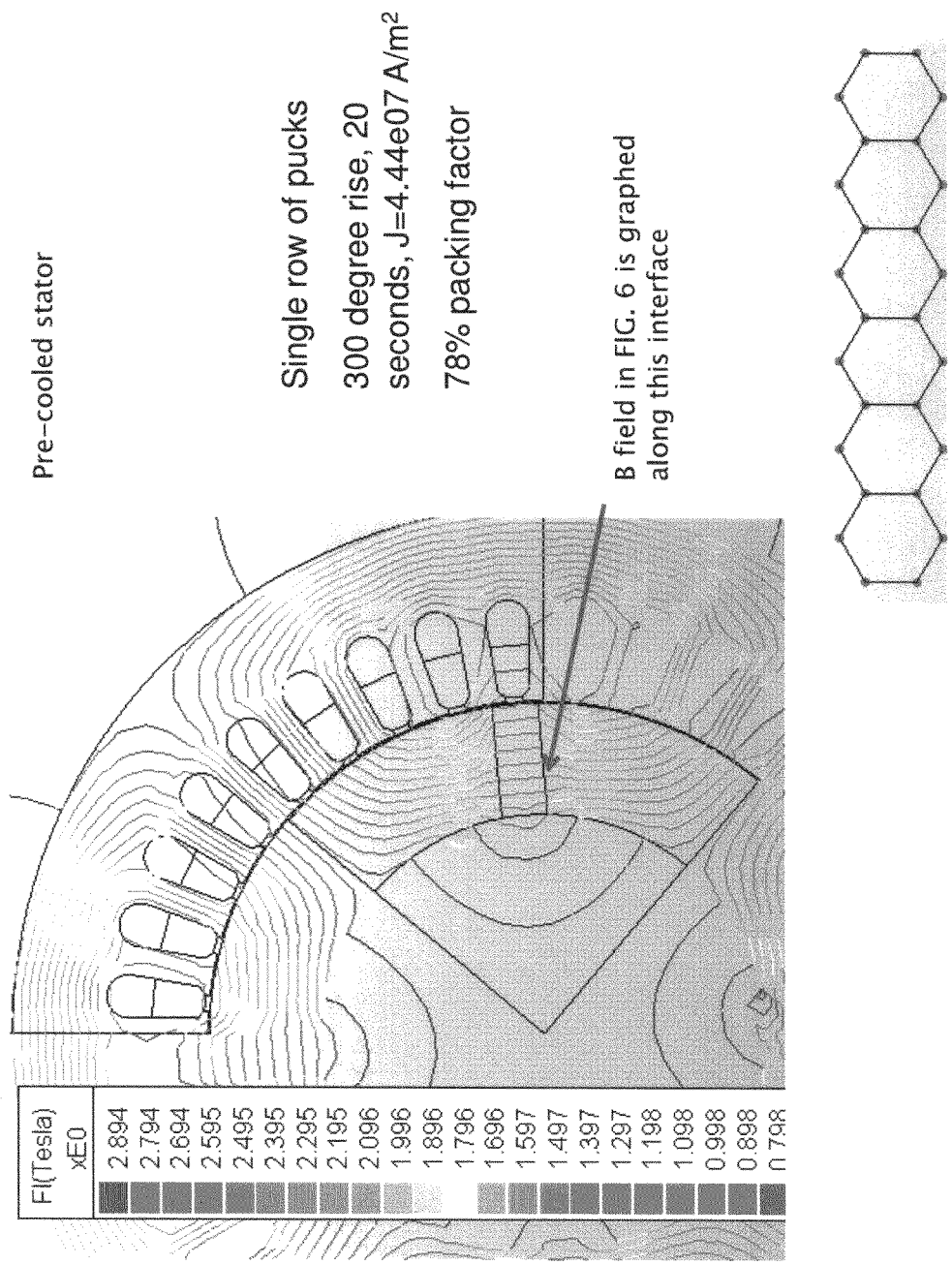
FIG. 6 depicts partial cross-sectional view of one of the present TFM rotors, showing the magnetic field expected in the rotor assuming a 300° C. temperature rise in the stator.

In some of the present embodiments, TFM bulks in the present rotors can be activated (magnetized) in an HTS motor by applying current to the windings in the stator (e.g. stator in FIG. 2). The embodiment of FIG. 2 may have the following dimensions: a stator radius ($St_{radius}$) of 9.5 cm, a rotor radius ($R_{radius}$) of 5.95 cm, a shaft radius ($S_{radius}$) of 3.95, a shaft diameter ($S_{diameter}$) of 7.9 cm, and a TFM-bulk opening height ($H_{opening}$) smaller than the shaft radius (e.g., as shown). In other embodiments (e.g., FIGS. 4 and 6), a TFM-bulk opening height ($H_{opening}$) may be larger than a shaft radius ($S_{radius}$). This involves balancing the adiabatic heating on the stator with cooling time on the rotor. A cooling scheme was devised for the motor that includes passing liquid nitrogen (N2) through the rotor shaft and to the interface between the TFM and rotor steel (e.g., in thermal communication with the TFM pucks). A transient boundary element analysis (illustrated in FIG. 3) was performed to predict the time required to cool the FIG. 2 structure (a four pole radial flux motor) using liquid N2. The thermal analysis indicates that about 10-20 s are required to cool the TFM pucks from 93K to 77+K and thus trap the field exposure.

Additionally, high temperatures in the stator may compromise the insulation in the stator. One can consider the effect on temperature in the stator winding if it is used to activate the TFM. If the stator has a cross-section area A with depth L with current density J and local conductivity σ, the ohmic power dissipation is $$P = (J \cdot A)^2 \frac{L}{\sigma A} \quad (1)$$

Adiabatic heating of the stator relates the power dissipation in time δt to the stator (copper) density ρ, the specific heat constant $C_p$, and the temperature rise ΔT as $$P\delta t = \rho C_p (AL) \Delta T \quad (2)$$

Combining (1) and (2) shows a relationship on the maximum allowed current density which is independent of the dimensions L and A, $$J = \sqrt{\frac{\rho \sigma C_p \cdot \Delta T}{\delta t}} \quad (3)$$

Figure 5:
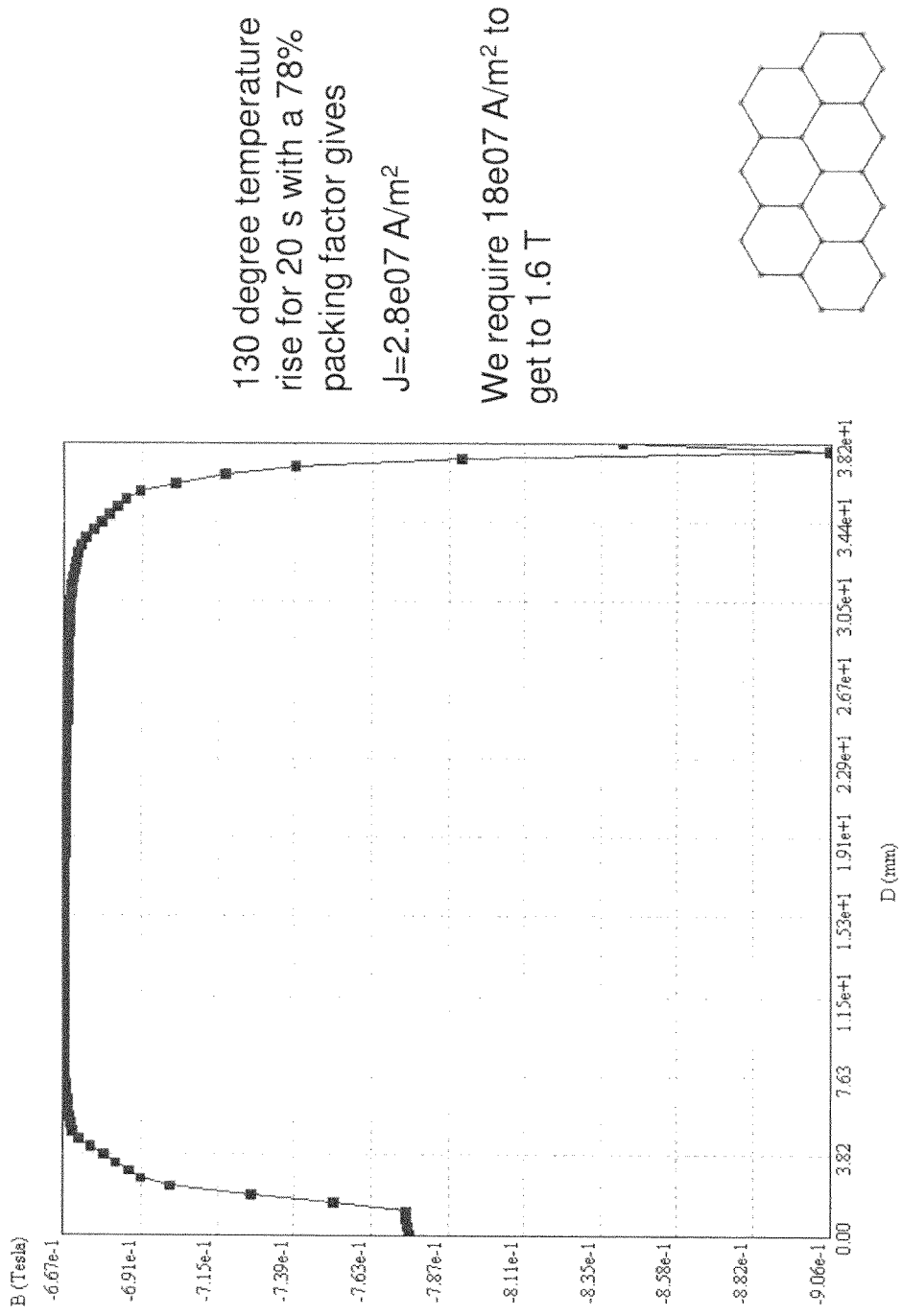
FIG. 5 depicts the expected B field across the TFM puck array shown in the corner of FIGS. 4 and 5 in the rotor configuration of FIG. 4 under the same conditions of FIG. 4.

Type H insulation limits the temperature on the stator to 180° C. If a working industrial environment is assumed to have an ambient temperature of 50° C., Equation (3) allows a current density of 28 MA/m². If a layered puck array as shown in the inset in FIG. 4 (0.8 cm thick) is employed in the FIG. 4 machine, a B field on the TFM array of only 0.67 T can be achieved, as indicated in the predictive plot in FIG. 5.

Figure 14:
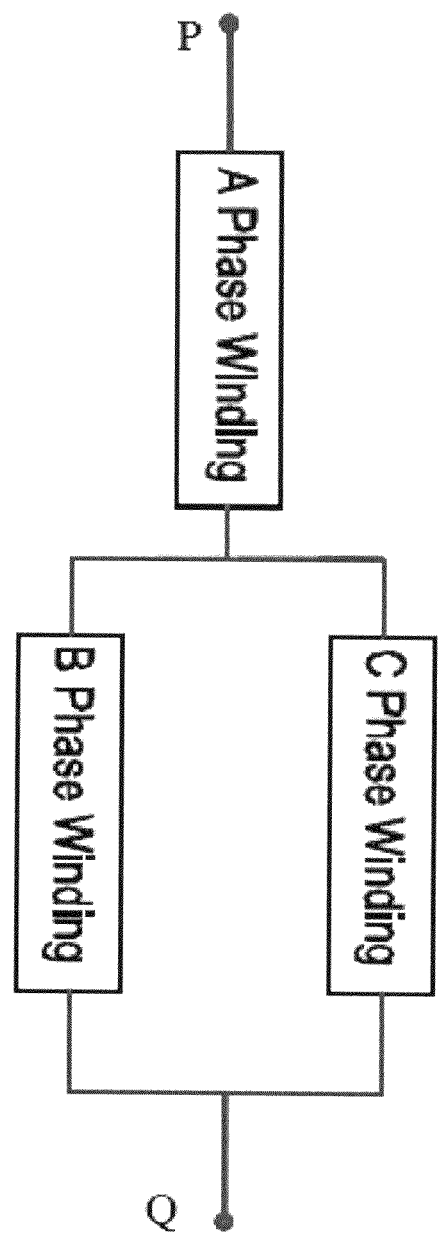
FIG. 14 depicts a conceptual schematic of windings for one of the present stators.

FIG. 14 shows the stator winding connection that can be used during activation. The B and C phase windings are connected in parallel and then subsequently connected with the A phase winding in series. Once the A phase winding position is rotated into alignment with the rotor d-axis, then appropriate levels of current are provided to P and Q to achieve the magnetic fields required to excite the TFM bulks in the rotor. No additional windings or coils in the stator or rotor are mandatory for the TFM bulk excitation. In some embodiments, this type of TFM bulk activation may be characterized as comprising using the stator's existing electrical circuit without the need for supplemental electrical circuits.

Figure 7A:
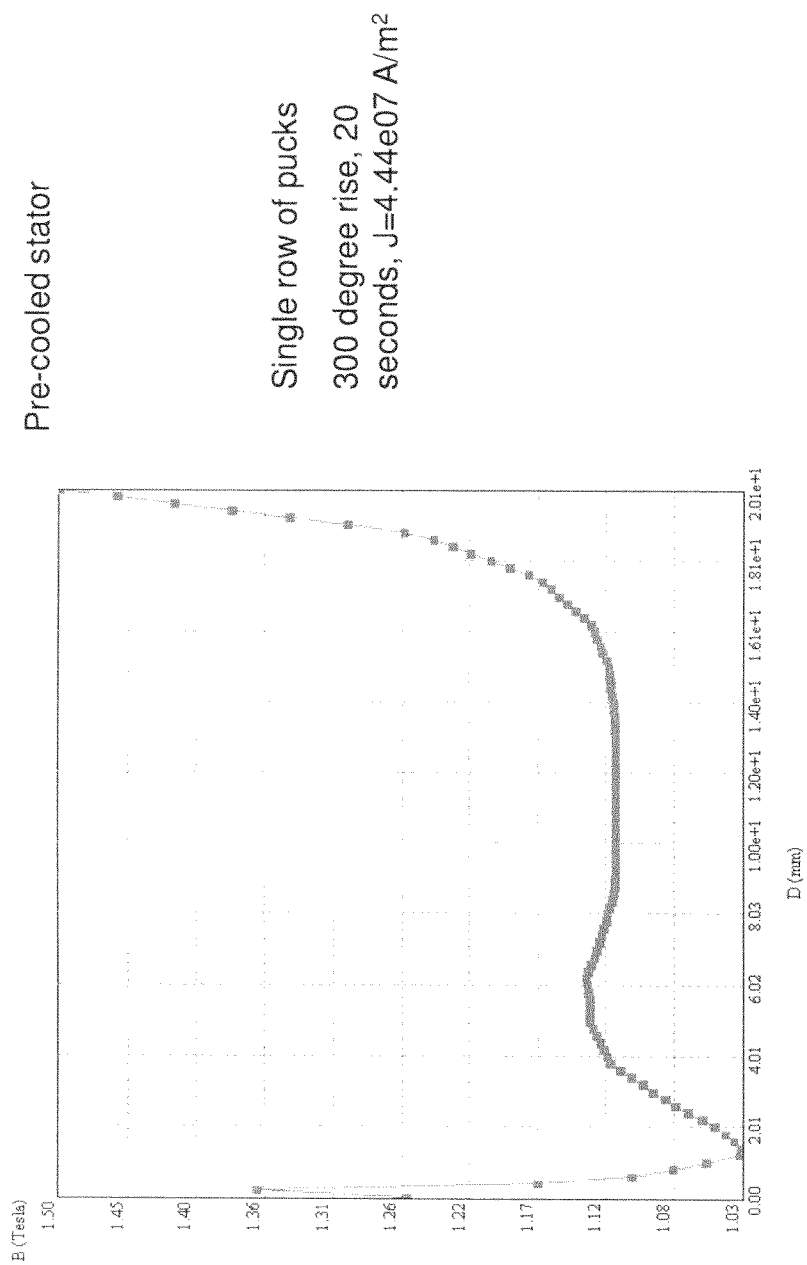
FIG. 7A depicts the expected B field across the TFM puck array shown in the corner of FIGS. 6 and 7A in the rotor configuration of FIG. 6 under the same conditions of FIG. 6.
Figure 7A:
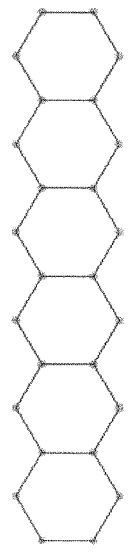

In practical applications, saturation in the stator may be more difficult to address than the limitations on thermal rise. Pre-cooling the stator allows a substantial improvement in the current density that can be employed on the stator, as illustrated predictively in FIG. 6. With higher stator current, steel in the stator may become quite saturated. Under these stressed conditions, the field achievable (e.g., as illustrated in the predictive plot in FIG. 7A) may not be superior to that of a conventional NdFeB rotor, except near the edges of the array where the field accentuates due to stator and rotor saturation.

Figure 7B:
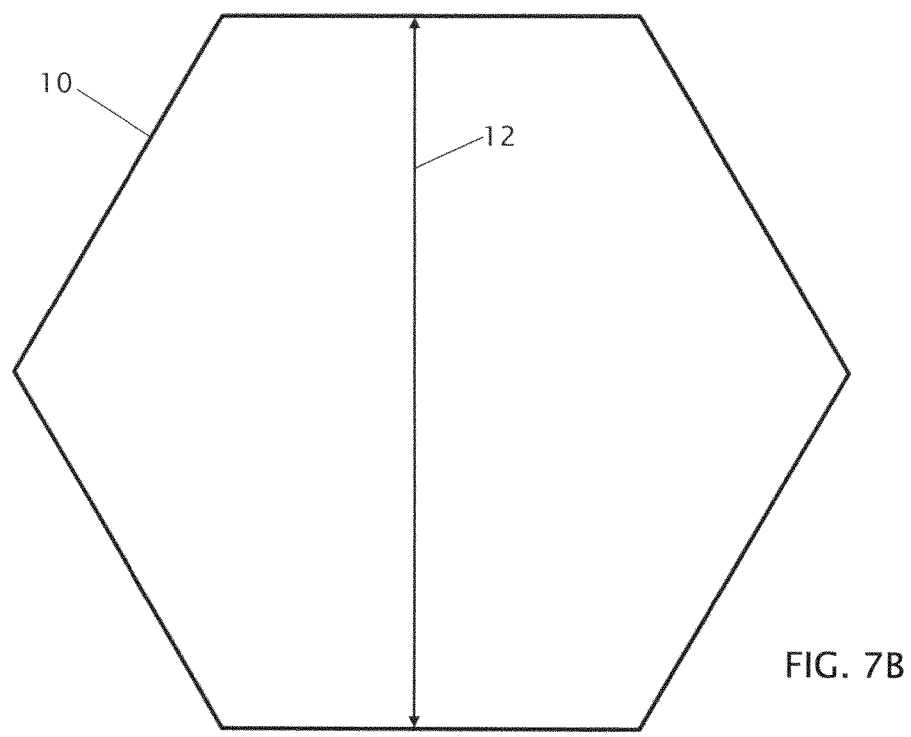
FIGS. 7B and 7C show top and side views of one of the present TFM pucks.
Figure 7C:
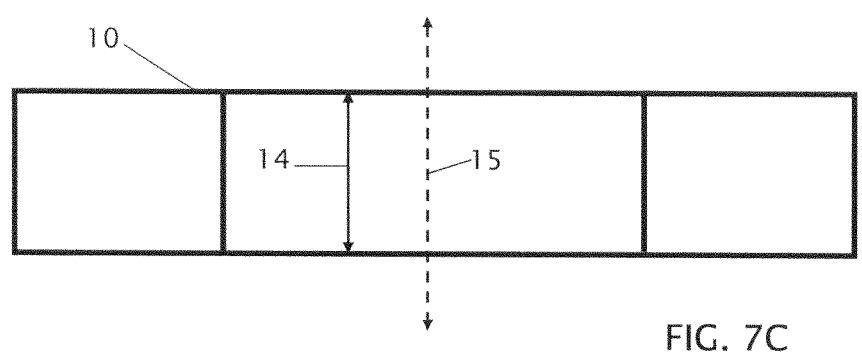

In future embodiments, larger-diameter TFM pucks can have a significant impact on activation requirements. For example, 1 cm hole can be drilled through a 3 cm diameter puck such that the activation field of the drilled 3 cm puck can be nearly the same as that of a 2 cm puck, but the larger puck allows cooling through the center drilled hole, and provides a more uniform field, with increased flux. This should drop the cooling time and increase the average field. Dimension 12 of hexagonal-shaped puck 10 shown in FIGS. 7B and 7C (several of which are displayed in the inset of, for example, FIG. 2) is an example of a transverse dimension greater than length 14 of puck 10 along central longitudinal axis 15 of puck 10. Dimension 12 may be characterized as the "width" of puck 10, and length 14 may also be characterized as the "thickness" of puck 10. Puck 10 is an example of puck that has a substantially constant cross-section (which has a hexagonal shape) along its length (and, more specifically in the depicted embodiment, a constant cross-section along its length).

III. Activation from the Rotor

Figure 8:
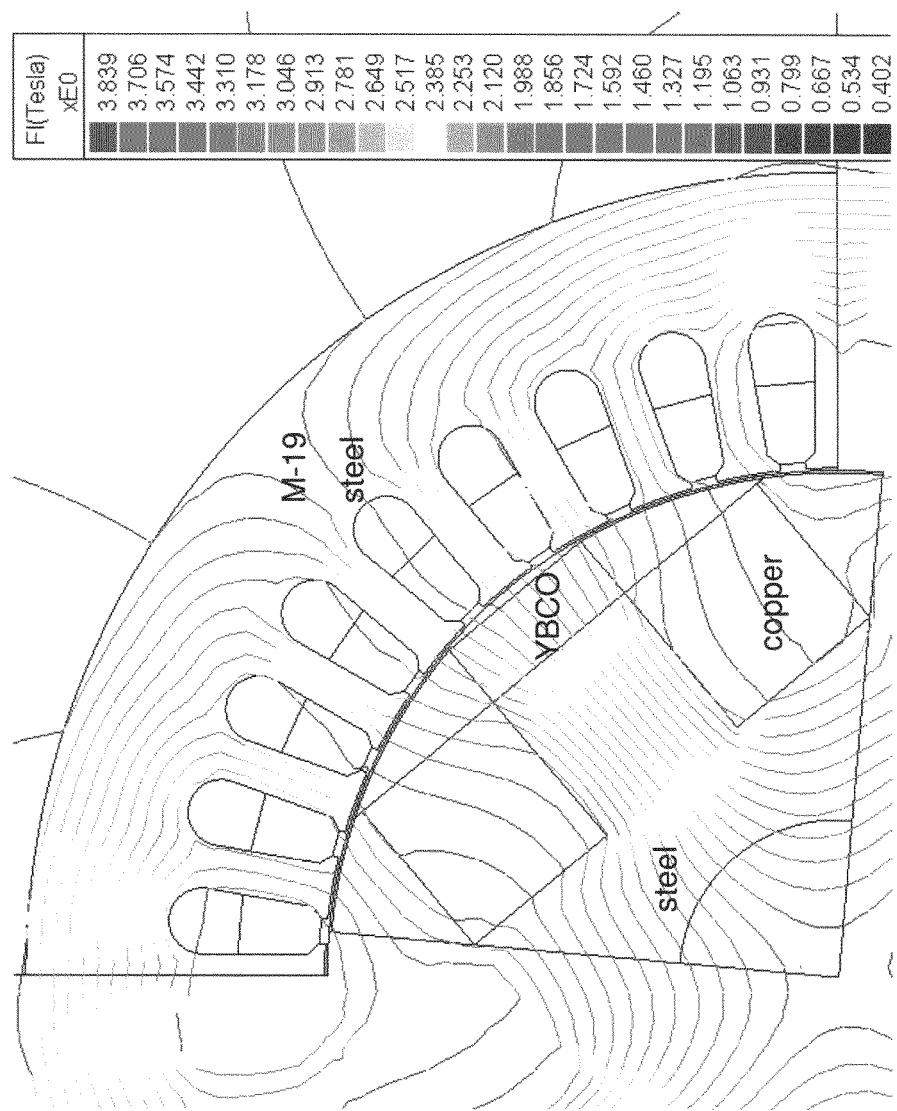
FIG. 8 depicts partial cross-sectional view of one of the present TFM rotors configured to be activated from the rotor, showing the magnetic field expected in the rotor.
Figure 9:
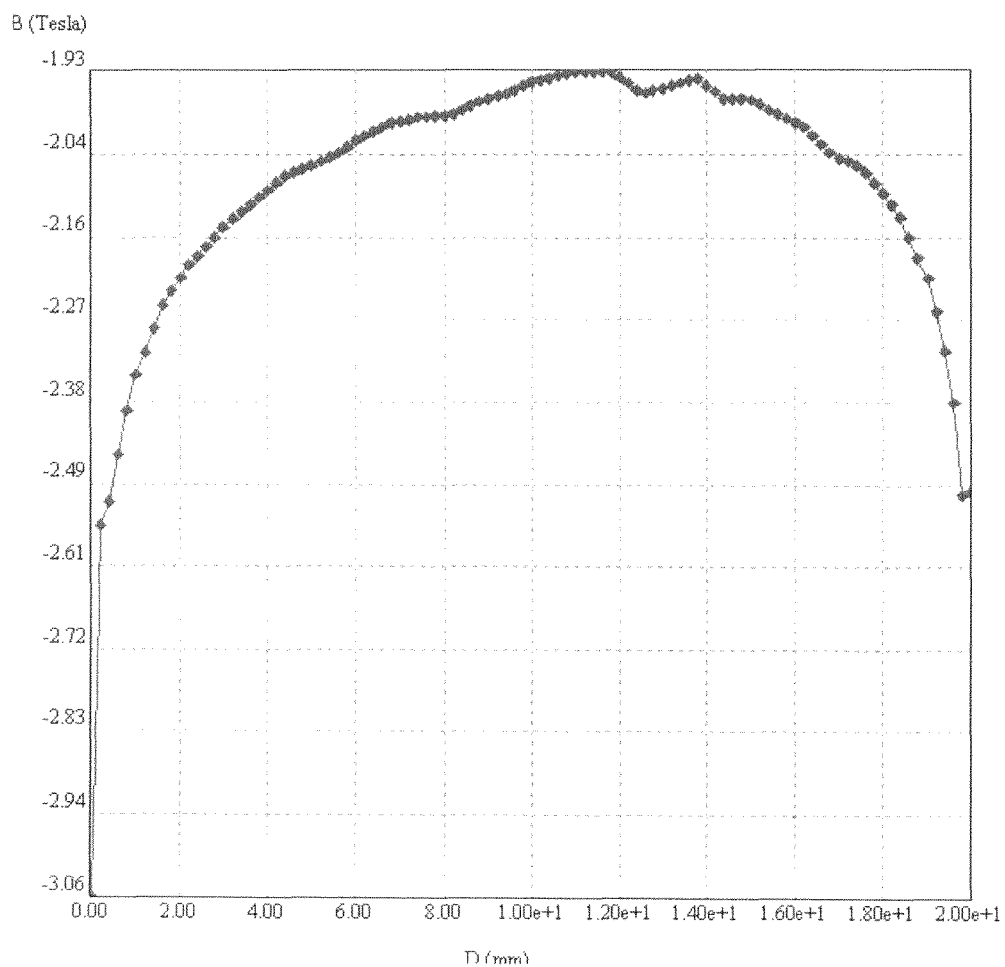
FIG. 9 depicts the magnetic field density expected along the interface of the TFM puck of FIG. 8.

In some embodiments, the TFM bulks or pucks may be activated by applying a current to conductors within the rotor instead of the stator. Such embodiments comprise a slip ring coupling (e.g., including coils). FIG. 8 shows such an embodiment suitable for generating a field in excess of 2T over the full TFM array, as shown predictively in FIG. 9. The thickness of the region annotated YBCO has been increased to accommodate a dewar extending into the air gap. Having MMF on the rotor may be advantageous and/or, in some embodiments, necessary, to activate at high field levels. In some embodiments, a tape wound steel core is used in place of the copper. In other embodiments, a self-excited generator to achieve the high fields desirable for activation.

IV. Running without Activation

HTS TFM motors can be run or operated successfully without a special activation pulse, albeit with a relatively small torque. This is sometimes referred to as the zero field cooled condition. Analysis of the device in this mode is best approached using the Bean model [7]. One technique tested by the team in [7] is to replace the TFM pucks with voltage fed coils [8].

Figure 10:
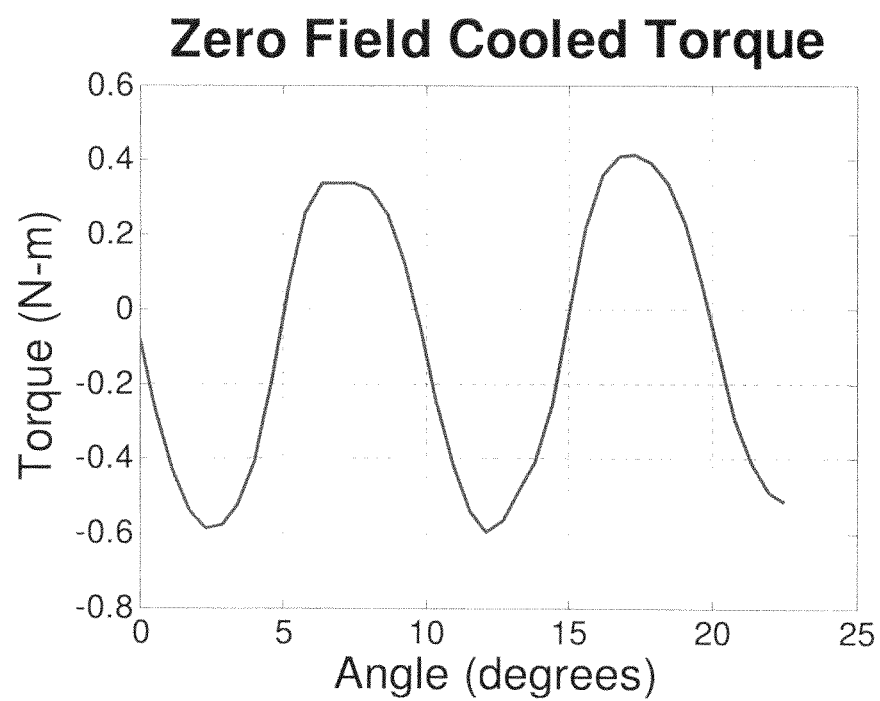
FIG. 10 depicts the torque expected from one of the present TFM machines when the TFM pucks are zero-field cooled.

The problem is complicated by the saliency of the rotor. The non-zero reluctance torque has a period of 22.5°. FIG. 10 shows the predicted torque as a function of rotor angle just due to the induced currents in the TFM. The 10° repetition rate is due to the spacing of the stator slots. The particular geometry can encourage localized slot leakage and the radial strips of TFM material may respond to this effect. The current in the TFM generally will only rise to the level sufficient to repel the flux from the bulk YBCO. Only a small fraction of the flux typically will go through the gap occupied by the TFM, which magnetically looks like air. The current in the TFM pucks is generally about 8 times that in one-half of one stator slot, but it is ineffective in coupling to the stator. A torque less than 0.5 N-m generally may result.

V. HTS Motor Using Bulk Trapped Field Magnets

Embodiments of the present motors can offer relatively high power density for electrical machine application and, thus, relatively low cost and high performance can be obtained with HTS machined using bulk TFMs. The investigation of Table 2 shows a comparison of total volume, active rotor material, cost of active material and machine efficiency of PM machines, HTS machines, and HTS TFM bulk machines.

TABLE 2

Performance vs Material Costs for 1 MW Motor between PM, TFMs and HTSC Machines

| Parameter | PM Machine | TFM Bulk | HTSC Wire |
|---|---|---|---|
| Total Volume (mm$^3$) | 114 * 10$^6$ | 33 * 10$^6$ | 17.9 * 10$^6$ |
| Active Rotor Material (mm$^3$) | 7.26 * 10$^6$ | 1.92 * 10$^6$ | 0.54 * 10$^6$ |
| Cost of Material | $13.66K | $5.265K | 50.90K |
| Efficiency | 96.5% | 98.7% | 98.1% |

A. Prototype of HTS Motor Using Bulk Trapped Field Magnet

Figure 11A:
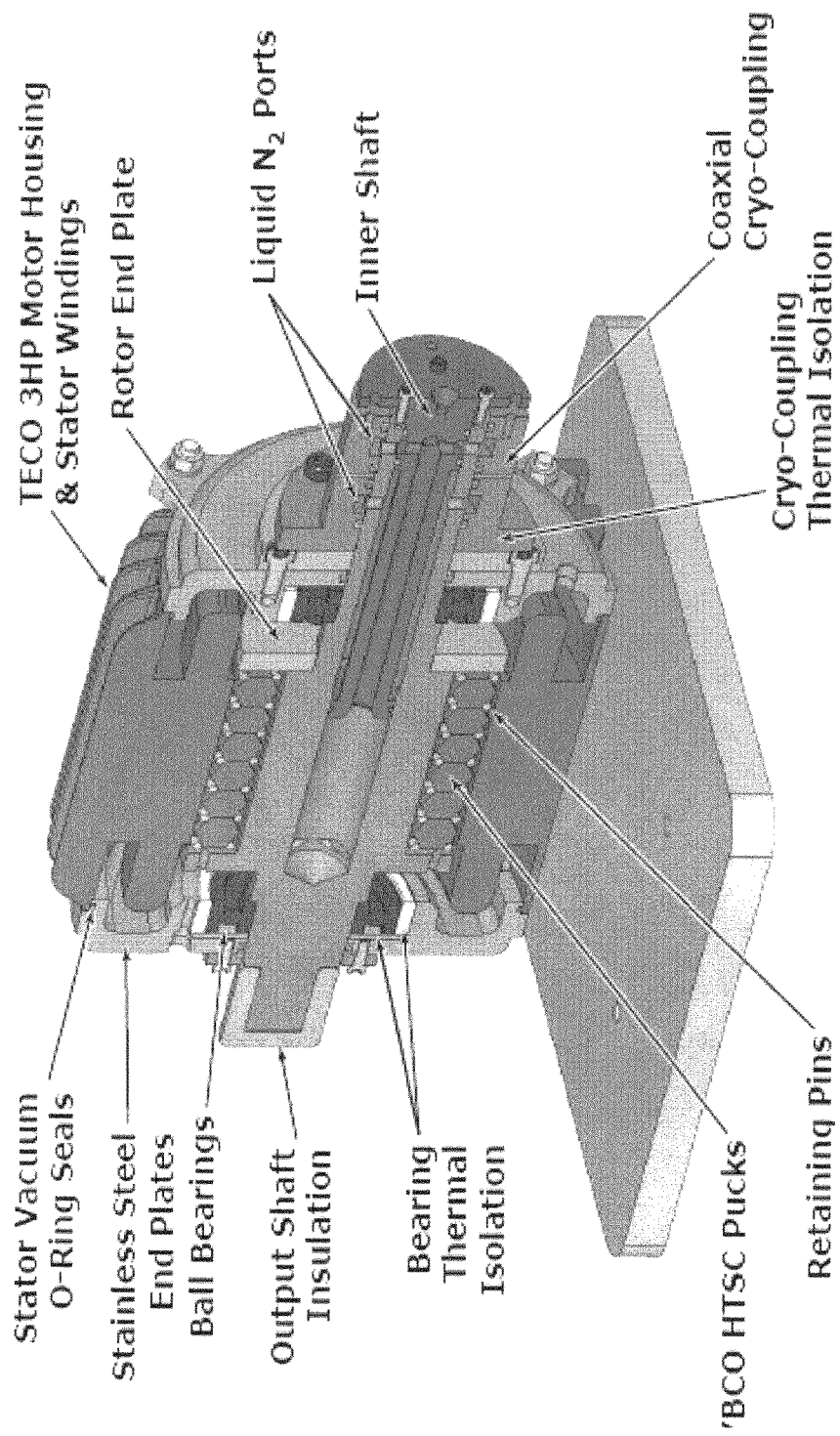
FIG. 11A depicts a cutaway view of an example of a HTSC TFM motor.

Differences for TFM machines relative to other machines (e.g., PM machines) include the fact that the TFM bulks in the motor must be activated or charged in situ, and it must be kept at cryogenic temperatures. As with embodiments of the present rotors and machines, an inner-TFM rotor structure (with TFM bulks disposed within the overall outer perimeter of the rotor, which can be defined at least in part by one or more end plates) was used for the prototype design. The configuration of an example of a radial flux HTS synchronous machine using TFM bulks is shown in FIG. 11A. More specifically, FIG. 11A shows an example of a TFM rotor that includes a rotor core having an axis of rotation and an outer perimeter, the rotor core defining a plurality of TFM-bulk openings around the axis of rotation and within the outer perimeter (which openings may be characterized as slots, and which may, as shown, be defined in part by an end plate of the rotor (e.g., an end plate of the rotor core)); a plurality of TFM bulks disposed in the openings, where the openings may number three or more disposed at equiangular intervals around the axis of rotation. Each of the pucks, or bulks, shown in FIG. 11A has a transverse dimension (comparable to dimension 12 in FIG. 7B) that is greater than its length (comparable to length 14 in FIG. 7C) along its central longitudinal axis (comparable to axis 15 in FIG. 7C), and those axes are substantially perpendicular (and, more specifically, perpendicular) to the axis of rotation of the rotor. The retaining pins that are depicted are examples of retaining pins in contact with a plurality of TFM pucks such that the retaining pins maintain the plurality of TFM pucks in substantially constant position relative to the rotor. The TFM-bulk openings have a length that is substantially parallel to the axis of rotation, and where a single row of TFM pucks is disposed in each TFM-bulk opening.

Figure 11B:
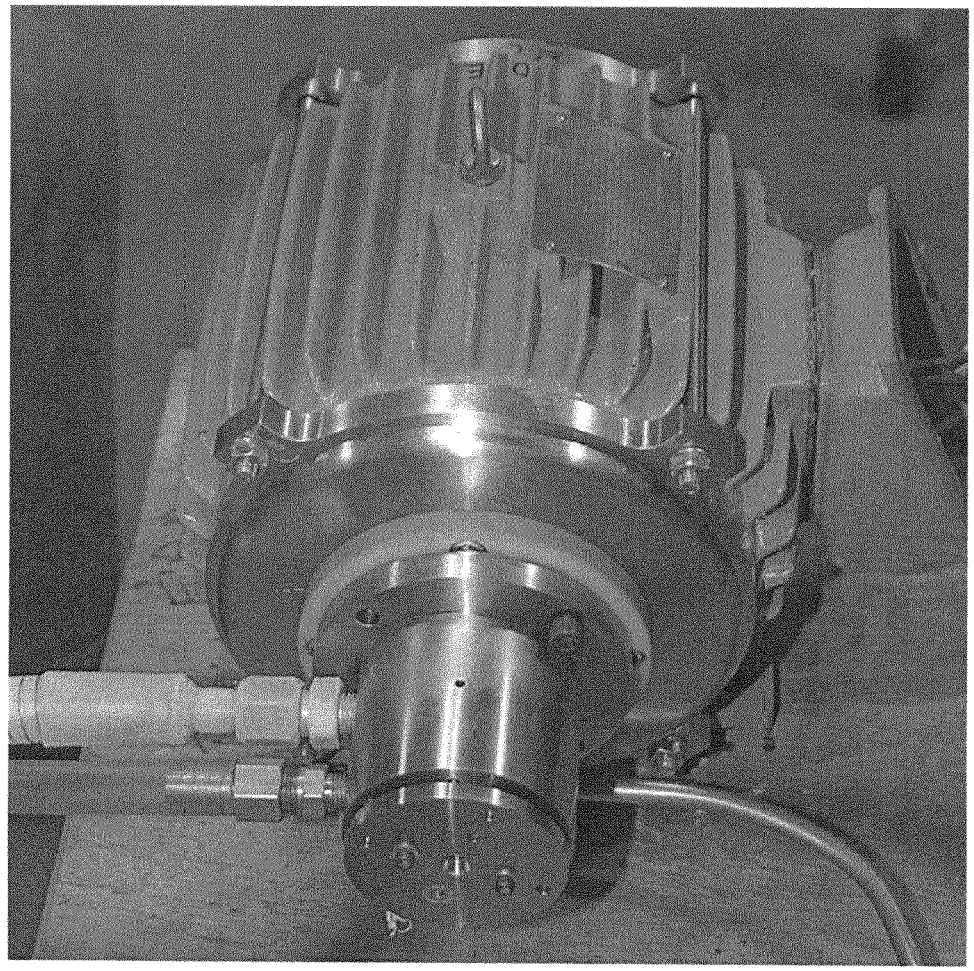
FIG. 11B depicts a prototype of one of the present TFM motors.

The prototype itself is depicted in FIG. 11B. Although not shown in either FIG. 11A or 11B, the rotor of the prototype included four TFM openings disposed around the axis of rotation at equiangular intervals.

B. Activation Tests

Two zero field activation tests were performed on the prototype of FIG. 11B that included 50 A and 110 A dc excitation levels. Upon completion of the activation, the motor was immediately operated as a generator. The open circuit voltage measurements for both tests are shown in Table 3.

TABLE 3

Magnet activation test results

| Activation Type | DC Current (A) | Time (s) | RPM | Output Volts, rms (V) |
|---|---|---|---|---|
| Zero | 110 | 2 | 675 | 9.0 |
| Zero | 50 | 10 | 721 | 20.5 |
| Field | 28 | 60 | 740 | 14.6 |
| Field | 8 | 600 | 730 | 15.7 |

Figure 12:
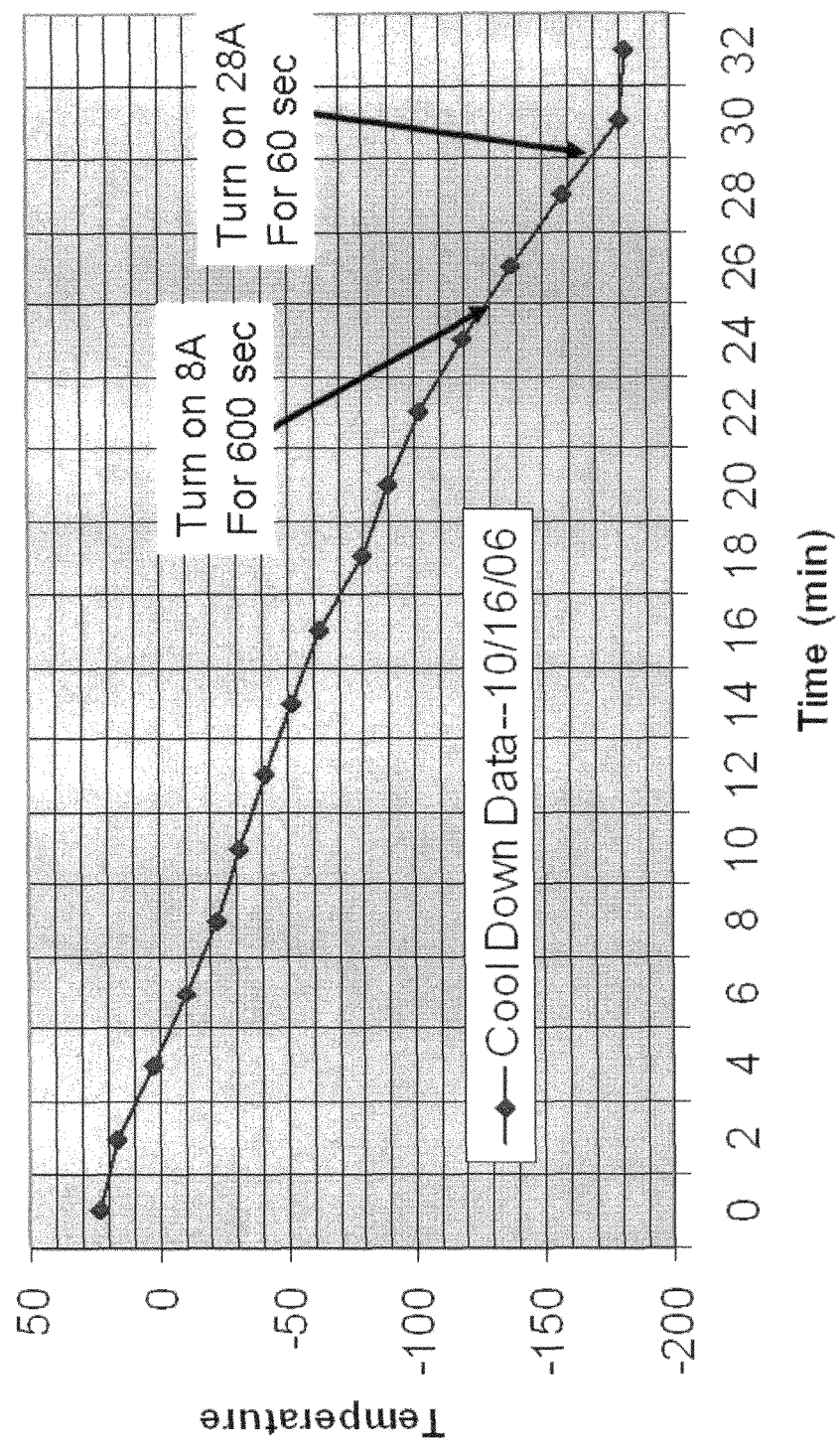
FIG. 12 depicts cool down data for the TFM motor of FIG. 11B with the timing planning for field activation tests.

Two field activation tests were performed. Because the initial motor cool-down rate demonstrated good repeatability (FIG. 12), a 28 A, 60 s dc charge current was applied when the temperature in the rotor reached −170° C.

An open circuit voltage of 14.6 V rms was measured at the output of the motor. Motor output without activation, cold (residual magnetism only) was measured to be 1.6 V rms.

The voltage then decayed over a period of 35 s to 4.1 V rms, not the level of the residual voltage of 1.6 V rms. This data suggests there is a slow decay of a small residual magnetic field as the system warms. The level region in the first approximately 50 seconds suggests the rotor was in thermal equilibrium with its environment. It does not necessarily prove, however, that all of the pucks were at the same temperature. While it is clear that some of the pucks were at a low enough temperature to be activated, the measured output voltage suggests that not all were.

C. Motor Operation Tests

The FIG. 11B motor was operated at 460 V in both activated and non-activated conditions from 15 to 60 Hz. RMS phase currents are listed in Table 4 for each operating frequency. Phase currents were measured using clamp around ammeters. The ac accuracy in 150 A range is +/−1.5% of reading +0.5 A. Current waveforms were recorded using an oscilloscope. The phase A ammeter behaved erratically and therefore the data may be suspect. The ammeter used during initial motor testing was less accurate by an unknown amount below 45 Hz. Finally, there may have been small differences in temperatures within this data set. Both time at temperature and changing thermal losses due to changing rotor speed complicate the data interpretation with the limited temperature data available.

TABLE 4

RMS motor current data

| | | Phase A (Amps-rms) | | Phase B (Amps-rms) | | Phase C (Amps-rms) | |
|---|---|---|---|---|---|---|---|
| Frequency | RPM* | Un-activated | Activated** | Un-activated | Activated** | Un-activated | Activated** |
| 15 | 450 | 4.63 | 3.80 | 13.70 | 12.92 | 15.80 | 3.47 |
| 20 | 600 | 4.89 | 4.56 | 16.48 | 10.65 | 14.67 | 8.57 |
| 30 | 900 | 5.25 | 5.26 | 18.03 | 10.82 | 16.02 | 14.06 |
| 40 | 1200 | 5.15 | 5.23 | 17.63 | 10.74 | 16.12 | 13.94 |
| 50 | 1500 | 4.88 | 5.01 | 17.17 | 9.32 | 17.10 | 11.52 |
| 60 | 1800 | 3.97 | 4.01 | 11.86 | 7.04 | 12.50 | 8.65 |

*Rotor speed measured with Shimpo DT301 digital stroboscope
**8 A DC field activation Full activation of the pucks should theoretically have produced significantly more voltage. The discrepancy may be explained by the following possible factors: (1) the pucks may have been at the upper temperature of field retention; (2) the charging window may have been mistimed; (3) the predictions assume a 100 mm length of continuous pucks and, due to puck shape, this overestimates the volume of puck material; and/or (4) there may have been temperature differences within a puck array and among the four arrays.

The only feedback on rotor temperature was from a sheathed thermocouple probe in the iron in the center of a magnetic pole. The lowest temperature measurements from the rotor probe ranged from −180° C. to −183° C. The probe submersed in liquid nitrogen will read −191° C. suggesting an absolute temperature measurement error of 5° C. To eliminate possible factor (2) above, a second attempt at field activation was performed using a lower current (8 A) for a much longer duration (600 s). The output voltage for a much lower charge current was comparable, so mistiming appears to have been a relatively small contributor to the lower than expected output voltage.

Figure 13:
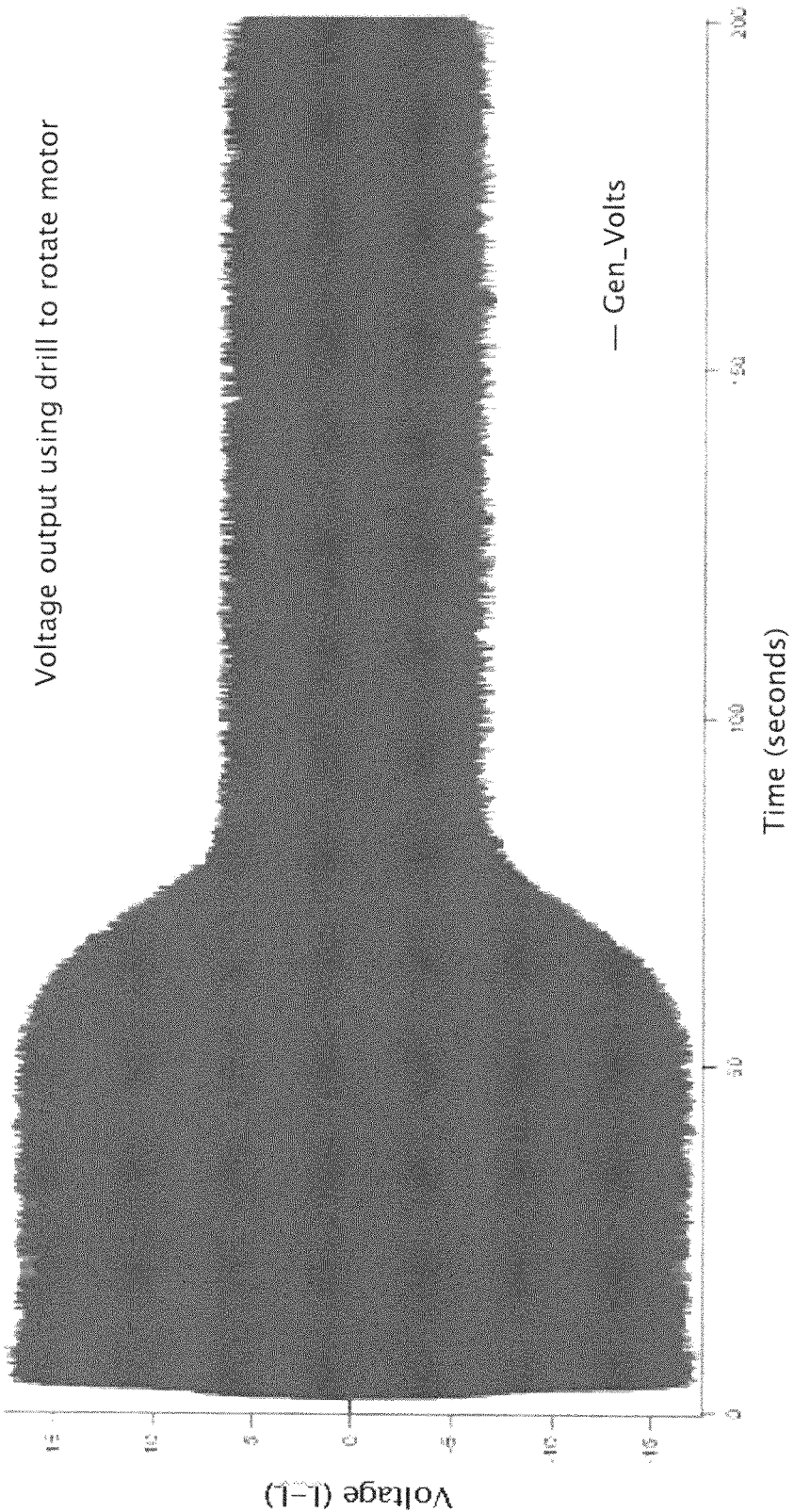
FIG. 13 depicts a chart of open circuit voltage of the motor of FIG. 11B as a function of time as the motor warms.

FIG. 13 shows the open circuit voltage as a function of time as the motor warmed. The cooling was turned off at time zero and the voltage began to decay after about 50 s.

D. Summary

The motor was operated using 460 V with a 5 hp motor drive at frequencies from 15 to 60 Hz in both the activated and non-activated states. The rms phase currents show a definite reduction across the frequency range when the pucks were activated. Synchronous operation was also verified at each frequency. Operating the motor as a generator turned out to be an effective diagnostic for determining puck activation. The data verified activation of the pucks using both field activation and zero field activation. When operating as a generator, the voltages produced were significantly lower than predicted. This behavior can likely be explained and minimized with improved thermal management.

The various illustrative embodiments of rotors and machines described herein are not intended to be limited to the particular forms disclosed. Rather, they include all modifications and alternatives falling within the scope of the claims. For example, in other embodiments, pucks have shapes differing from those shown in the figures may be used, such as octagonal-shaped pucks or circular-shaped pucks. Furthermore, while the TFM-bulk openings shown in FIG. 11A are defined in part by the rotor end plate, such openings in other embodiments may not extend axially to the rotor end plate.

The claims are not intended to include, and should not be interpreted to include, means-plus- or step-plus-function limitations, unless such a limitation is explicitly recited in a given claim using the phrase(s) "means for" or "step for," respectively.

REFERENCES

The following references are incorporated by reference at the locations cited above.

[1] G. Fuchs, K. Nenkov, G. Krabbes, R. Weinstein, A. Gandini, R. Sawh, B. Mayes, and D. Parks, "Strongly enhanced irreversibility fields and Bose-glass behaviour in bulk YBCO with discontinuous columnar irradiation defects." *Supercond. Sci. Technol.* 20 (2007) S197-S204.
[2] Roy Weinstein, Ravi Sawh, Yanru Ren, Michael Eisterer, Harald W. Weber, "The role of uranium chemistry and uranium fission in obtaining ultra-high Jc in textured Y123." *Supercond. Sci. Technol,* 11 (1998) 959-962.
[3] Martin W. Rupich, Darren T. Verebelyi, Wei Zhang, Thomas Kodenkandath, and Xizoping Li, "Metalorganic Deposition of YBCO Films for Second-Generator High-Temperature Superconductor Wires," *Materials Research Journal*, vol. 29, no. 8, 2004.
[4] K. Salama, V. Selvamanickam, L. Gao and K. Sun, "High current density in bulk YBCO superconductor," *Appl. Phys. Lett.,* 54, 2352 (1989).
[5] M. Tomita and M. Murakami, "HTS bulk magnets that can trap over 17 Tesla at 29 K," *Nature,* 42, 517 (2003).
[6] R. Weinstein, J. Liu, Y. Ren, R-P Sawh, D. Parks, C. Foster, and V. Obot, Invited Paper, "Very High Trapped Fields: Cracking, Creep, and Pinning Centers," *Proc. of 10th Anniversary HTS Workshop on Physics, Materials and Applications*, Houston, edited by W. K. Chu, D. Gubser, and K. A. Müller, World Scientific Press, p. 625 (1996)
[7] C. Bean, *Revs. Mod. Phys.,* 36, 31 (1964).
[8] Kent R. Davey, Roy Weinstein, and Ravi Sawh, "Development and analysis of YBCO tapped field magnets in elecromechanical devices," *IEEE Transactions on Magnetics*, Vol. 44, No. 6, June 2008, pp. 930-933.

The invention claimed is:

1. A trapped-field magnet (TFM) rotor comprising:
   a rotor core having an axis of rotation and an outer perimeter, the rotor core defining a plurality of TFM-bulk openings around the axis of rotation and within the outer perimeter; and
   a plurality of TFM bulks disposed in the TFM-bulk openings of the rotor core;
   wherein the plurality of TFM-bulk openings comprises three or more TFM bulk openings disposed at equiangular intervals around the axis of rotation;
   wherein each TFM bulk has a first dimension in a radial direction that is greater than a second dimension in a second direction that is perpendicular to the radial direction; and
   wherein the rotor is configured to rotate within a stator.

2. The rotor of claim 1, where the plurality of TFM bulks comprises a plurality of TFM pucks.

3. The rotor of claim 1, wherein at least one of the plurality of TFM bulks comprises a single grain.

4. The rotor of claim 2, where at least some of the plurality of TFM pucks are adjacent one another in one of the plurality of TFM-bulk openings.

5. The rotor of claim 2, where at least one of the plurality of TFM pucks has a substantially constant cross-section along its length.

6. The rotor of claim 5, where each of the plurality of TFM pucks has a transverse dimension that is greater than its length along a central longitudinal axis.

7. The rotor of claim 6, where each of the plurality of TFM pucks is configured such that its central longitudinal axis is substantially perpendicular to the axis of rotation of the rotor.

8. The rotor of claim 1, wherein at least one of the plurality of TFM bulks comprises YBCO.

9. The rotor of claim 1, where the plurality of TFM-bulk openings comprises four TFM-bulk openings.

10. The rotor of claim 9, where the rotor core includes an end plate and one or more of the TFM-bulk openings is defined in part by the end plate.

11. The rotor of claim 1, wherein the TFM-bulk openings have a length that is substantially parallel to the axis of rotation.

12. The rotor of claim 1, wherein a single row of TFM pucks is disposed in each TFM-bulk opening.

13. The rotor of claim 1, wherein two rows of TFM pucks are disposed in each TFM-bulk opening.

14. The rotor of claim 1, wherein each of the plurality of TFM-bulk openings has a height measured perpendicularly to the axis of rotation of the rotor, wherein the rotor is configured to be coupled to a shaft having a diameter, and wherein the height of each TFM-bulk opening is smaller than the radius of the shaft.

15. The rotor of claim 1, wherein each of the plurality of TFM-bulk openings has a height measured perpendicularly to the axis of rotation of the rotor, wherein the rotor is configured to be coupled to a shaft having a diameter, and wherein the height of each TFM-bulk opening is larger than the radius of the shaft.

16. The rotor of claim 14, wherein the rotor is unitary with the shaft.

17. The rotor of claim 1, where the rotor core comprises a first material, and defines a plurality of conductor opening around the axis of rotation and within the outer perimeter, the rotor further comprising:
   a plurality of conductors disposed in the conductor openings; and
   one or more slip-ring couplings configured to permit a current to be applied to the plurality of conductors if the rotor is rotating relative to the stator.

18. The rotor of claim 1, where the rotor core comprises a first material, and defines a plurality of conductor opening around the axis of rotation and within the outer perimeter, the rotor further comprising:
   a plurality of conductors disposed in the conductor openings; and
   one or more slip-ring couplings configured to permit a current to be applied to the plurality of conductors if the rotor is rotating relative to the stator.

19. A trapped-field magnet (TFM) synchronous machine comprising:
   a stator comprising slots and windings, the stator defining a rotor opening; and
   the rotor of claim 1 disposed in the rotor opening of the stator such that the rotor can rotate relative to the stator.

20. The machine of claim 19, where the windings of the stator comprise:
   A-phase windings;
   B-phase windings; and
   C-phase windings;

where the B-phase windings are connected in parallel with the C-phase windings, and the A-phase windings are connected in series with the B-phase and C-phase windings.

21. The machine of claim 19, where the stator comprises field coils, and where the machine is configured as a self-excited generator.

22. A trapped-field magnet (TFM) synchronous machine comprising:
   a stator comprising slots and windings, the stator defining a rotor opening; and
   the rotor of claim 17 disposed in the rotor opening of the stator such that the rotor can rotate relative to the stator.

23. A trapped-field magnet (TFM) rotor comprising:
   a rotor core having an axis of rotation and an outer perimeter, the rotor core defining a plurality of TFM-bulk openings around the axis of rotation and extending through the outer perimeter; and
   a plurality of TFM bulks disposed in the TFM-bulk openings of the rotor core;
   wherein the plurality of TFM-bulk openings comprises three or more TFM bulk openings disposed at equiangular intervals around the axis of rotation;
   wherein each TFM bulk has a first dimension in a radial direction that is greater than a second dimension in a second direction that is perpendicular to the radial direction; and
   wherein the rotor is configured to rotate within a stator.

* * * * *